United States Patent

Yamashita et al.

[11] Patent Number: 5,513,281
[45] Date of Patent: Apr. 30, 1996

[54] INTERPOLATION METHOD AND APPARATUS BY CORRELATION DETECTION USING FUZZY INFERENCE

[75] Inventors: Haruo Yamashita, Osaka; Hideshi Ishihara; Tsumoru Fukushima, both of Katano, all of Japan

[73] Assignee: Matsushita Electric Industrial Co., Ltd., Osaka, Japan

[21] Appl. No.: 422,607

[22] Filed: Apr. 13, 1995

Related U.S. Application Data

[63] Continuation of Ser. No. 985,122, Dec. 2, 1992, abandoned.

[30] Foreign Application Priority Data

Dec. 2, 1991 [JP] Japan .................................... 3-317820

[51] Int. Cl.$^6$ ........................... G06F 17/15; G06F 17/00; G06K 9/64; G06G 7/00
[52] U.S. Cl. ...................... 382/278; 382/288; 382/300; 395/3; 395/61; 395/900
[58] Field of Search ............................ 382/278, 288, 382/291, 300; 348/413, 416, 441, 448; 395/3, 61, 900

[56] References Cited

U.S. PATENT DOCUMENTS

| | | | |
|---|---|---|---|
| 4,985,764 | 1/1991 | Sato | 348/448 |
| 4,992,869 | 2/1991 | Samad et al. | 348/451 |
| 5,027,205 | 6/1991 | Avis et al. | 348/441 |
| 5,070,403 | 12/1991 | Wilkinson | 348/413 |
| 5,162,907 | 10/1992 | Keating et al. | 348/416 |
| 5,167,005 | 11/1992 | Yamakawa | 395/3 |
| 5,185,849 | 2/1993 | Miyazawa et al. | 395/61 |
| 5,243,666 | 9/1993 | Hasegawa et al. | 382/41 |

FOREIGN PATENT DOCUMENTS 2-177683  6/1990  Japan .............................. H04N 7/01

OTHER PUBLICATIONS

Shashin Kogyo, "Photographic Industries", vol. 47, No. 486, pp. 107–108 Oct., 1989.

*Primary Examiner*—Jose L. Couso
*Assistant Examiner*—Matthew C. Bella
*Attorney, Agent, or Firm*—Willian Brinks Hofer Gilson & Lione

[57] ABSTRACT

Interpolation method and apparatus for interpolating pixels using levels of pixels surrounding a pixel to be interpolated is disclosed wherein a level difference between two pixels on an interpolation line is calculated for all interpolation lines, likelihoods of correlation are calculated from the level differences obtained using a membership function, an interpolation direction is determined based on the likelihoods of correlation and directions of the interpolation lines and an interpolation value for the pixel to be interpolated is calculated based on levels of two pixels on the interpolation line having the interpolation direction determined.

7 Claims, 13 Drawing Sheets

INTERPOLATION DIRECTION

INTERPOLATION DIRECTION

INTERPOLATION METHOD AND APPARATUS BY CORRELATION DETECTION USING FUZZY INFERENCE

This is a Continuation Application of application Ser. No. 07/985,122 filed Dec. 2, 1992, now abandoned.

BACKGROUND OF THE INVENTION

1. Field of the Invention

The present invention relates to an interpolation method and apparatus used, for example, for generating a frame signal from a field signal in televisions, video recorders, printers, photocopiers, and similar devices that use gray or color scale images in the image and data processing fields.

2. Prior Art

Pixel resolution conversion technologies have become increasingly important with the development of digital imaging devices. In IDTV (improved definition TV) and EDTV (enhanced definition TV), a single frame is generated by interlacing two fields in the broadcast signal and video signal, and the method of non-interlaced reproduction of these frames becomes very important.

This non-interlaced reproduction of frames can be easily accomplished using the information from one previous field when there is a correlation between the frames as in still images. When there is no precise frame correlation as in a moving image, the information from the previous field is the information for a point in time 1/60th second earlier and cannot be used for direct field interlacing. It is therefore necessary to interpolate the data for one field between the scan lines to reproduce one complete frame.

The printer engine in video printers and other video signal hard copy printers likewise records images with the same number of pixels as in a complete frame. If the input video signal is a still image, the printer can print the image directly to paper, but if the signal is a moving image, the printer engine must interpolate the information for one field to obtain the same number of pixels as in the full frame before printing the image.

Linear interpolation using the average values of the pixels in the preceding and following scan lines has conventionally been used for field interpolation. Because this interpolation method generates additional pixel data from only a few pixels, the object has been to smooth the image by increasing the number of pixels rather than to improve the resolution. The interpolated image is therefore relatively defocused or blurred compared with the original source image.

Another interpolation method has since been developed to resolve these problems with linear interpolation by using statistical properties of the image, e.g. the continuity between fields in a moving image, to obtain a higher vertical resolution and to obtain diagonal lines that are smoother than in the linearly interpolated image by using correlation detection.

This interpolation method using correlation detection is explained in further below with reference to FIG.

In FIG. 17 lines A and C are scan lines from the same field input continuously to the rasterizer. Line B is the scan line that is not input in this field and which must be interpolated. If the pixel to be interpolated is pixel Bn in line B where n is the pixel number, the differences ($\Delta 1, \Delta 2, \Delta 3$) in the three brightness levels passing through pixel Bn between lines A and C are expressed by the following equations.

$$\Delta 1 = |A_{n-1} - C_{n+1}|$$

$$\Delta 2 = |A_n - C_n|$$

$$\Delta 3 = |A_{n+1} - C_{n-1}|$$

The value to be used for the interpolated pixel Bn is selected by determining which of these differences is smallest, and then applying a corresponding equation.

Thus, if min.=$\Delta 1$, $B_n = |A_{n-1} + C_{n+1}|/2$ if min.=$\Delta 2$, $B_n = |A_n + C_n|/2$ if min.=$\Delta 3$, $B_n = |A_{n+1} + C_{n-1}|/2$ Thus, this interpolation method compares the level difference of the pixel An above and the pixel Cn below the interpolated pixel Bn with the level difference of the pixel An+1 right above and the pixel Cn−1 left below, and the level difference of the pixels An−1 left above and Cn+1 right below the interpolated pixel Bn. It is assumed that the continuity, i.e., correlation, between the images is highest in the direction in which the pixel level difference is minimum, and uses the average of the pixel values in this direction as the value of the interpolated pixel. (See Shashin Kogyo (Photography industry), October 1989, pp. 107–108.) There is a related method that expands this concept to gray scale interpolation and expands the direction of interpolation to the right and left of these three directions (Japanese Patent Laid-Open No. H2-177683).

PROBLEM TO BE SOLVED

With this conventional method, however, the correlation determining the interpolation direction is evaluated by comparing the absolute values of the pixel level differences in plural interpolation directions, specifically vertically, and right and left diagonally in the above method. The highest correlation between images is determined to be in the direction of the lowest level difference, and the pixel is interpolated in this direction. This results in the following problems.

If the pixel level difference is high in all interpolation directions it should be determined that there is no real correlation and linear interpolation should be applied. But if there is even a slight difference in the pixel levels, a correlation will be wrongly detected, the average of the pixels in this wrong interpolation direction will therefore be used as the interpolated value, and pixel noise and image deterioration will result.

Furthermore, if the pixel level difference is low in all directions and there is a correlation in all directions, it should be determined that there is a real correlation between the lines and linear interpolation should be applied. But if there is even a slight difference in the pixel levels, a correlation will again be wrongly detected, and pixel noise and image deterioration will result.

FIG. 18 is an example of an image in which interpolation noise will occur. The circles drawn with a solid line are input pixels, the dotted line circles are interpolated pixels and hatched circles indicate black pixels. In this example, two vertical black lines are input one pixel apart and the pixel Bn to be interpolated is between two black vertical lines. Although the minimum pixel level difference should be detected in the three interpolation directions shown in the figure, the pixel level difference will be low in all three directions in this example. But if there is some slight variance for any reason and the level difference is lowest in either diagonal direction, that will be selected as the interpolation direction. Bn will therefore be interpolated as a black pixel, resulting in noise.

Furthermore, if the pixel level difference is equally small in both diagonal directions compared with the vertical pixel level difference, i.e., a contradiction 10 exists in determining the correlation from the pixel level difference, it should be determined that! there is no correlation and linear interpolation in the vertical direction should be applied. With the conventional method, however, one of these diagonal directions will be selected, again resulting in image deterioration.

In general, the correlation interpolation method smoothes diagonal lines in the image and improves vertical resolution if the correlation can be correctly detected using continuous elements in the image and the interpolation direction is correct, but noise and loss of image quality result if the correlation is not correctly detected. How the correlation is evaluated therefore becomes extremely important.

To obtain an image of quality equal to a full frame signal image from a field signal requires that even nearly horizontal diagonal lines be improved. This requires at least seven directions of interpolation. When the direction closest to the horizontal is used for interpolation, nearly horizontal diagonal lines can be improved, but when the interpolation is wrong, significant noise and loss of horizontal resolution result because the interpolated pixels are horizontally separated by six pixels. Thus, when the number of pixels used to determine the correlation is large, higher precision correlation detection is required the closer the interpolation direction is to the horizontal.

SUMMARY OF THE INVENTION

Therefore, an object of the present invention is to provide an interpolation apparatus that applies correlation detection, prevents image deterioration from correlation detection errors, and improves interpolation performance near the vertical and horizontal directions.

In order to achieve the object, according to the present invention, there is provided an interpolation method for interpolating pixels by detecting correlation between each pair of pixels on adjacent two scan lines having been input, said pair of pixels being consisted of those locating on one of plural interpolation lines set beforehand so as to pass through a pixel to be interpolated, comprising steps of calculating a level difference between said pair of pixels for each of said plural interpolation lines, executing a fuzzy antecedent processing by evaluating a likelihood of correlation between said pair of pixels for each of said plural interpolation lines using the level differences obtained in the above step, executing a fuzzy consequent processing by determining one interpolation line to be used for interpolation among said plural interpolation lines based on results obtained in the above fuzzy antecedent processing, and calculating an arithmetic mean of the pair of pixels on said one interpolation line having been determined and, thereby, interpolating pixels to be interpolated using the arithmetic mean obtained.

Further, according to the present invention, there is provided an interpolation apparatus for interpolating pixels by detecting correlation between each pair of pixels on adjacent two scan lines having been input, said pair of pixels being consisted of those locating on one of plural interpolation lines set beforehand so as to pass through a pixel to be interpolated comprising a first calculation means for calculating an arithmetic mean of said each pair of pixels for all said interpolation lines, a second calculation means for calculating a level difference between said each pair of pixels for all said interpolation lines, a fuzzy antecedent processing means for judging correlation between said each pair of pixels for all said interpolation lines based on level differences obtained by said second calculation means, a fuzzy consequent processing means for determining an interpolation line to be used for interpolation based on results of judgment by said fuzzy antecedent processing means, and a selection means for selecting an output of said first calculation means corresponding to the pair of pixels on said interpolation line determined whereby said pixel to be interpolated is interpolated with said output of said first calculation means selected.

In one aspect of the present invention, the fuzzy antecedent processing means may provide with a first membership function calculation means for estimating a degree of correlation between each pair of pixels for each of said interpolation lines using a first membership function being a function of the level difference, a second membership function calculation means for estimating a degree of uncorrelation between each pair of pixels for each of said interpolation lines using a second membership function being a function of the level difference and a logical product calculating means for taking a fuzzy logical product of the degree of correlation obtained by the first membership function calculation means and the degree of uncorrelation obtained by the second membership function calculation means to employ the fuzzy logical product as a likelihood of correlation for each interpolation line.

The present invention, with the interpolation method and apparatus organized as above, globally judges the most plausible interpolating direction by means of fuzzy inference using the fuzzy antecedent processing means that obtains the likelihood of correlation each interpolation line based on the differences of pixel levels between two pixels on each interpolation line and the fuzzy consequent processing means that determines the interpolating direction. The present invention then outputs the arithmetic mean of pixel levels between the two pixels on the interpolating direction as the output of interpolation.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

Figure 1:
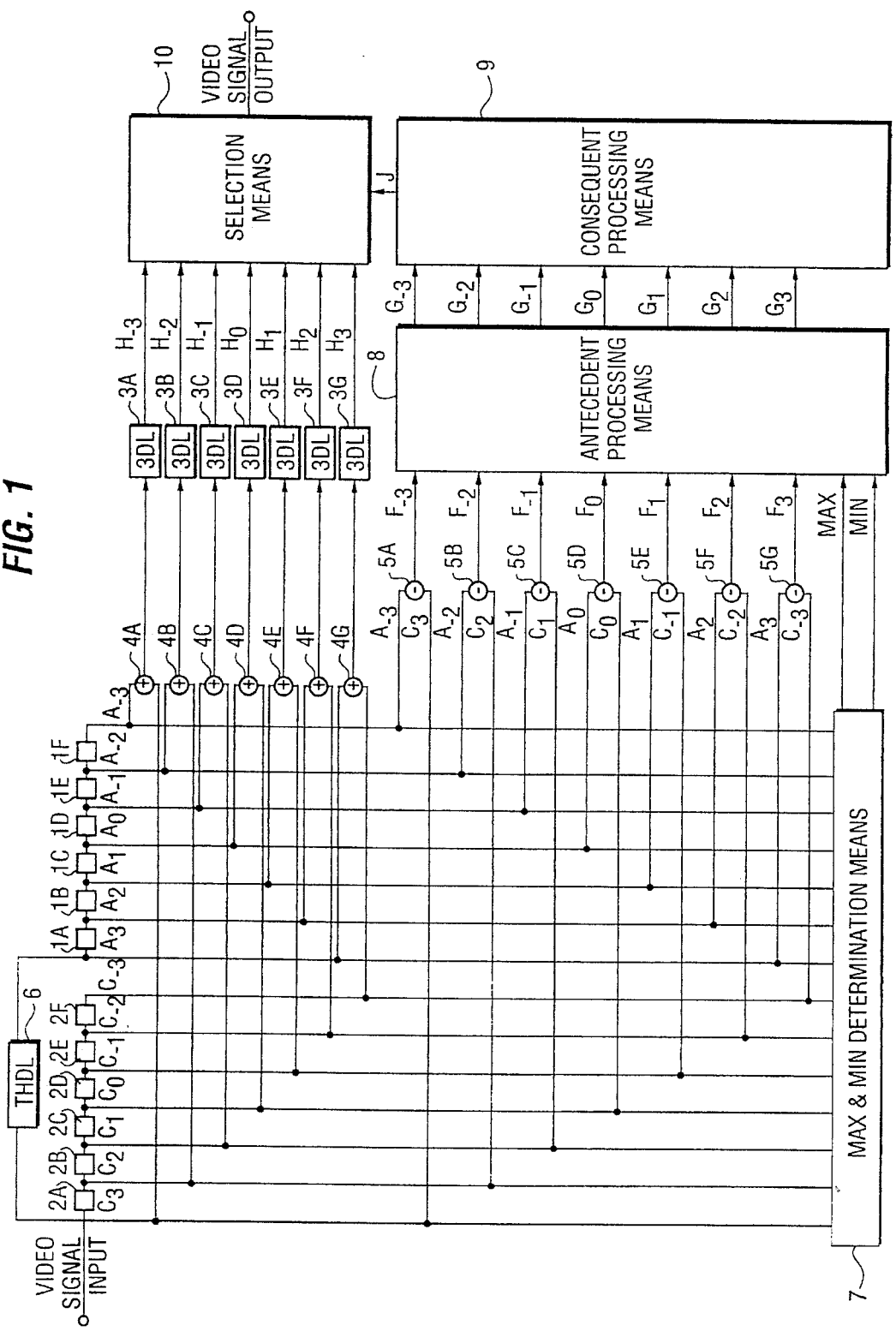
FIG. 1 shows a block diagram of the interpolation equipment of the first embodiment according to the present

FIG. 1 shows a block diagram of the interpolation apparatus according to the first embodiment of the present invention. In FIG. 1, reference alphanumerics 1A to 1F denote horizontal delay means that delay pixel levels by one pixel, whereby pixel levels on the line (line A) immediately above a target pixel to be interpolated are shifted one by one.

Reference alphanumerics 2A to 2F denote horizontal delay means that delay pixel levels by one pixel, whereby pixel levels on the line (line C) immediately below the target pixel are shifted one by one.

Reference alphanumerics 3A to 3G denote horizontal delay means that delay pixel levels by three pixels to synchronize them to a position of the target pixel.

Reference alphanumerics 4A to 4G denote average calculating means that obtain an arithmetic mean of pixel levels between a pixel on line A and a pixel on line C.

Reference alphanumerics 5A to 5F denote subtracting means that obtain a difference of pixel levels between a pixel on line A and a pixel on line C.

Reference numeral 6 denotes a vertical delay means that delays pixel levels by one scan line period in order to synchronize the output of pixel levels on line A with the output of pixel levels on line C.

Reference numeral 7 denotes a maximum and minimum detecting means that obtains the maximum value max and the minimum value min of the input pixel levels on line A and on line C.

Reference numeral 8 denotes a fuzzy antecedent processing means of the fuzzy inference that obtains a likelihood of correlation.

Reference numeral 9 denotes a fuzzy consequent processing means of the fuzzy inference that determines an interpolation direction to be employed based on likelihoods of correlation calculated by the fuzzy antecedent processing means 8.

Reference numeral 10 denotes a selection means that passes one of input data selectively in response to a selection signal.

Figure 3:
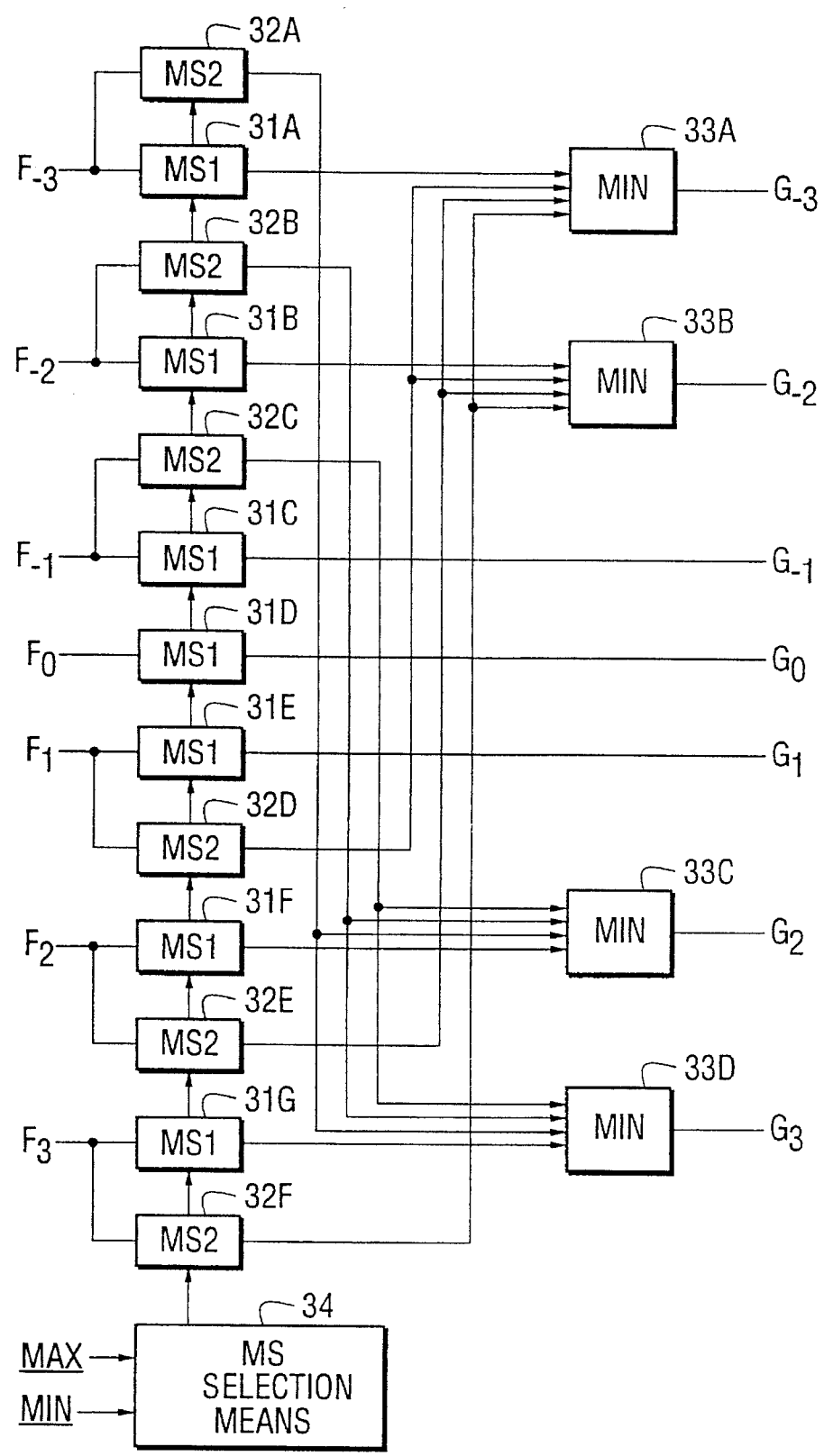
FIG. 3 shows a block diagram of the fuzzy antecedent processing means in the first embodiment.
Figures 4A, 4B, 4C, 4D:
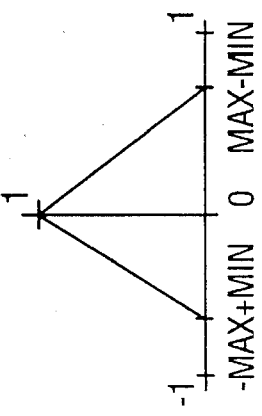
FIGS. 4(a)–4(h) show the graphs of first membership functions and second membership functions in the first embodiment.
Figures 4E, 4F, 4G, 4H:
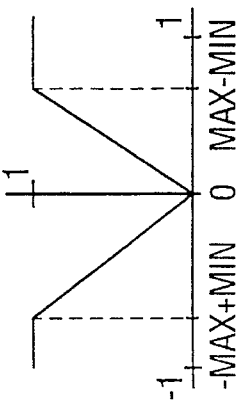

FIG. 3 is a block diagram of the antecedent processing means 8.

In FIG. 3, first membership function means 31A to 31G output a degree of correlation for each interpolation line using a first membership function. The particular first membership function utilized depends upon the maximum and minimum values of the levels of the 14 pixels A(−3) to A(3) and C(−3) to C(3), as determined by the max. & min. determination means 7 (FIG. 1). The potential ranges of the maximum and minimum values are each divided into 8 predetermined subranges, and the actual maximum and minimum values each fall within a specific maximum and minimum subrange, respectively. The 8 maximum and 8 minimum value subranges thus provide for 64 possible combinations of subranges, and each corresponds to a particular linear first membership function. The antecedent processing means 8 (FIG. 1) stores each of the 64 first membership functions in table format and outputs a degree of correlation from the table corresponding to the appropriate first membership function. Examples of first membership functions are shown in FIGS. 4(a)–(d).

Second membership function means 32A to 32F output a degree of uncorrelation for each interpolation line using a second membership function. The second membership function is chosen, as is the first membership function, based on the maximum and minimum values of the levels of the 14 pixels A(−3) to A(3) and C(−3) to C(3), as determined by the max. & min. determination means 7 (FIG. 1). The antecedent processing means 8 (FIG. 1) outputs a degree of uncorrelation from the table corresponding to the appropriate second membership function. Examples of second membership functions are shown in FIGS. 4(e)–4(h).

Fuzzy logical product calculation means 33A to 33D performs the fuzzy AND (i.e., p AND q=min (p, q), where p, q= [0,1]) operation and obtains a likelihood of correlation for each interpolation line by calculating a fuzzy AND of an output from one of the first membership function means and the three outputs from corresponding second membership function means. The fuzzy logical product means 33A to 33D thus determines the likelihoods of correlation G(−3) to G(3) by considering the degree of correlation in one interpolation direction along with the degree of uncorrelation in the three opposing directions of interpolation. For example, 33A selects a likelihood of correlation G(−3) as the minimum value of the degree of correlation between A(−3) and C(3) and the degrees of uncorrelation between A(1) and C(−3), A(2) and C(−2), and A(3) and C(−3). The fuzzy AND, therefore, detects the situation of a high correlation in one direction and a low uncorrelation in an opposing direction, and corrects the error accordingly.

The membership function choosing means chooses tables of the first and second membership functions nearest to those obtained when normalized using maximum and minimum values max and min output from the maximum and minimum determination means 7.

Figure 5:
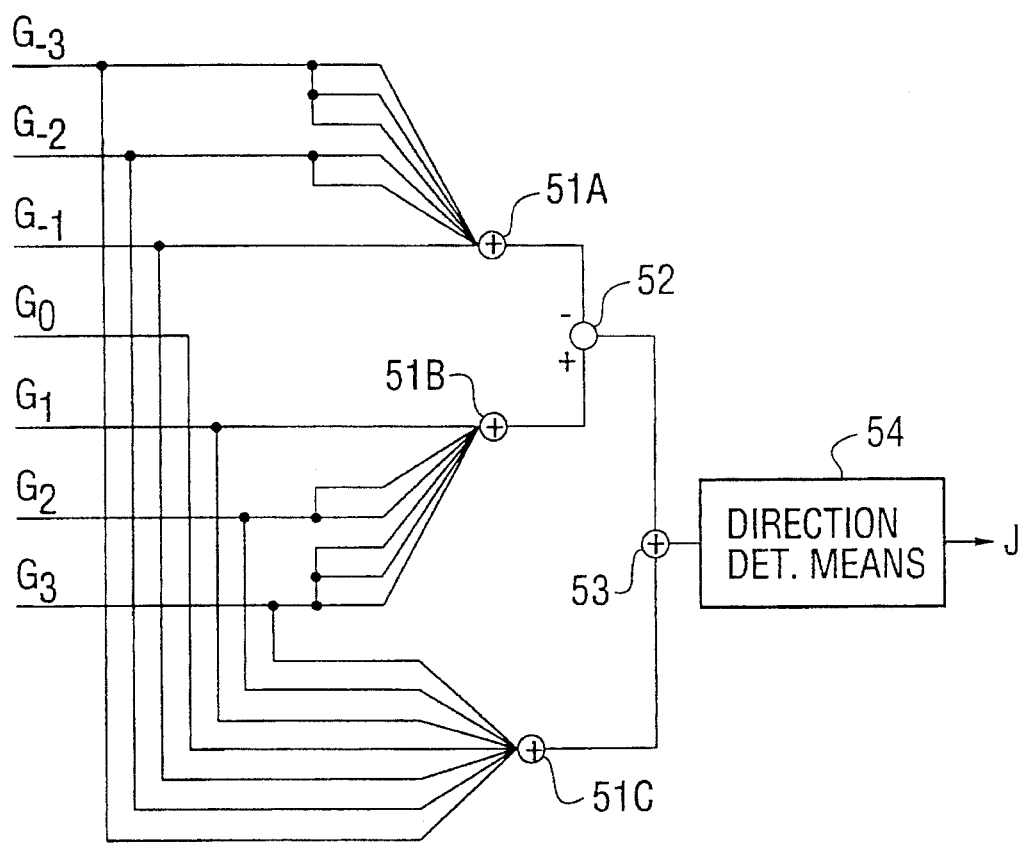
FIG. 5 shows a block diagram of the fuzzy consequent processing means of the first embodiment.

FIG. 5 shows a block diagram of the fuzzy consequent processing means 9. Reference alphanumeric 51A to 51C denote multiinput adding means, respectively; 52 denotes a subtracting means; 53 denotes a dividing means. These means constitute a fuzzy inference part. Reference numeral 54 denotes a direction determining means that converts a continuous value between −3 and 3, which is output from the dividing means 53, to an integer between 0 to 6, which designates an interpolating direction to be employed.

Figure 8:
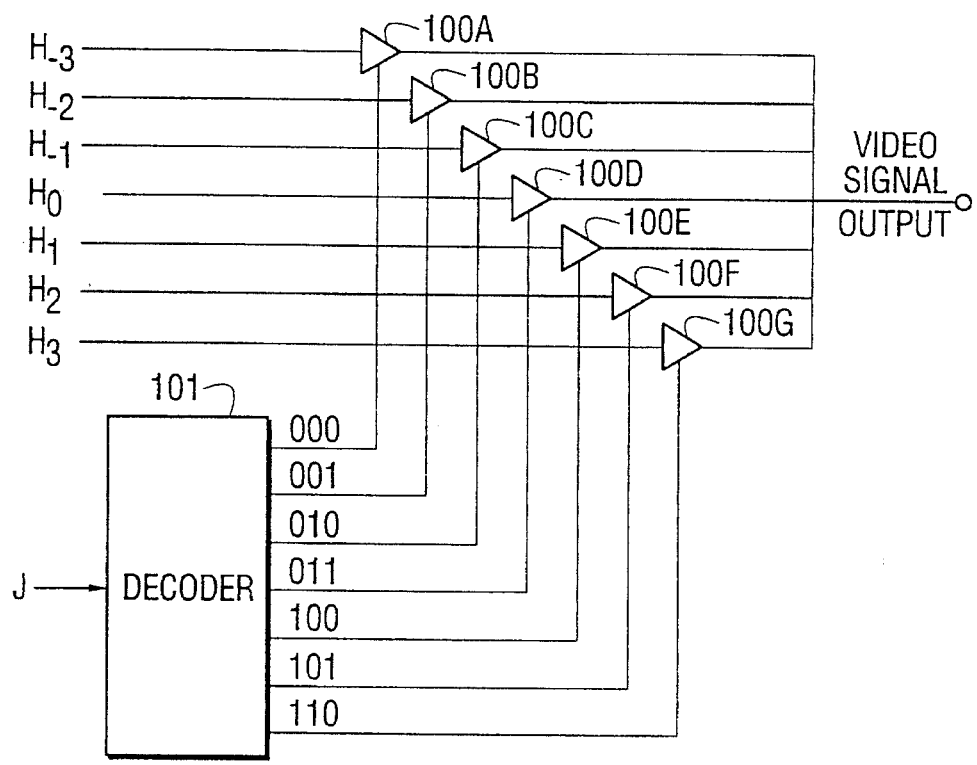
FIG. 8 shows a block diagram of the choosing means of the first embodiment.

FIG. 8 shows an example of the circuit of the selection means 10 in FIG. 1. Reference alphanumerics 100A to 100G denote analog switches. Their outputs are connected to a wired OR, which outputs one of interpolation values H(−3) to H(3) output from the average calculating means 4A to 4G via the delay means 3A to 3G to an image output terminal.

Reference numeral 101 denote a binary decoder that decodes input three bit data J from the direction determining means 54 of the consequent processing means 9 and activates a corresponding analog switch of 100A to 100G.

The operation of the interpolation apparatus organized as above is described below with reference to the attached drawings.

The image data input from the image input terminal in FIG. 1 is converted to the pixel levels C(−3), C(−2), C(−1), C(0), C(1), C(2), C(3) (suffixed C in FIG. 1) of 7 pixels on line C by the horizontal delay means 2A to 2F. Similarly, the image data is converted to the pixel levels A(−3), A(−2), A(−1), A(0), A(1), A(2), A(3) (suffixed A in FIG. 1) of 7 pixels on line A by the vertical delay means 6 and horizontal delay means 1A to 1F.

Figure 2:
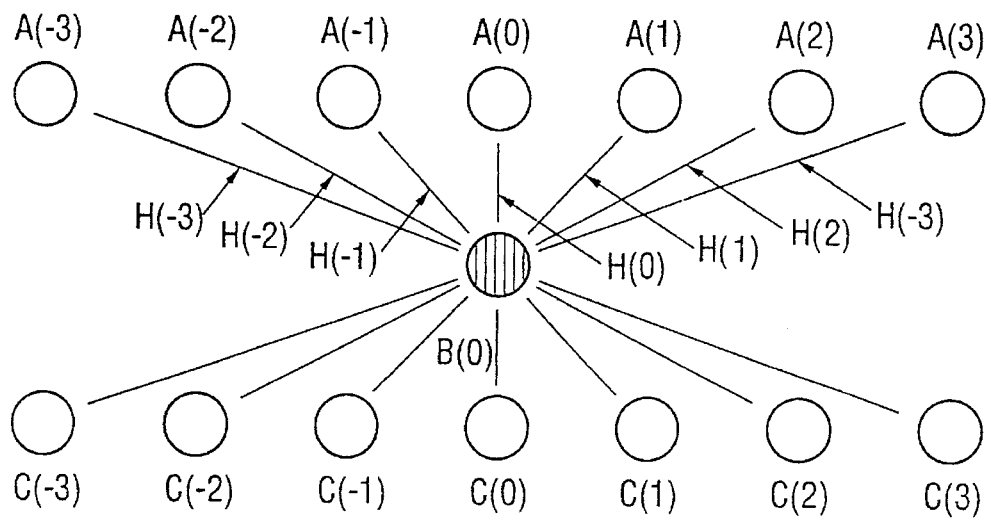
FIG. 2 shows pixels and interpolation lines for describing the procedure of interpolation in the first and the second embodiments.

FIG. 2 is a conceptual figure for illustrating interpolation operation together with positional relation of pixels on line A and line C, the target pixel to be interpolated, and the interpolation lines in the seven directions. The pixel level B(0) of the target pixel is denoted by $B_0$, and the interpolation values H(−3) to H(3) for interpolation lines are denoted by $H_{-3}$ to $H_3$, respectively.

In FIG. 1, the pixel levels on line A and line C are input into the average calculating means 4A to 4G, each of which calculates the arithmetic mean of the pixel levels of the two pixels on the corresponding interpolation line. Specifically, 4A, 4B, 4C respectively calculate H(−3), H(−2), H(−1) for interpolation lines downward to the right with angles 18 degrees, 27 degrees, 45 degrees to the horizontal line respectively. 4D calculates H(0) for the vertical interpolation line. 4E, 4F, 4G calculate H(1), H(2), H(3) for interpolation lines upward to the right with angles 45 degrees, 27 degrees, 18 degrees to the horizontal line respectively. These mean values are input into the selection means 10. On the other hand, the antecedent processing means 8 and consequent processing means 9 determine which of these 7 values is adopted as the pixel level to be interpolated. And the selection means 10 selectively outputs the selected value to the image output terminal.

In FIG. 1, the pixel levels on line A and line C are also input into subtracting means 5A to 5G, each of which calculates a level difference of two pixels on the corresponding interpolation line. Specifically, 5A, 5B, 5C respectively calculate F(−3), F(−2), F(−1) for interpolation lines downward to the right with angles 18 degrees, 27 degrees, 45 degrees to the horizontal line, respectively. 5D calculates F(0) for the vertical interpolation line. 5E, 5F, 5G calculate F(1), F(2), F(3) for interpolation lines upward to the right with angles 45 degrees, 27 degrees, 18 degrees to the horizontal line, respectively. These difference values are input to the antecedent processing means 8.

The maximum and minimum determination means 7 obtains the maximum value mar and the minimum value min of pixel levels A(−3), A(−2), A(−1), A(0), A(1), A(2), A(3), C(−3), C(−2), C(−1), C(0), C(1), C(2), C(3).

The antecedent processing means 8 obtains a likelihood of correlation G(i) (i=−3 to 3) for each interpolation line using the differences of pixel levels F(−3) to F(3) obtained by the subtracting means 5A to 5G and the maximum value max and the minimum value min obtained by the maximum and minimum determination means 7. In order to obtain the likelihoods of correlation G(−3) to G(3), the membership function choosing means 34 in FIG. 3 decodes the upper three bits of max and min and chooses tables of the first membership function MS1 and second membership function MS2 nearest to those obtained when normalized using max and min.

The likelihoods of correlation G(−1), G(0), G(1) for interpolation lines belonging to a first group consisting of the vertical line and near-vertical lines are determined as values picked up from the chosen table of the first membership function MS1 depending upon values F(−1), F(0), F(1), respectively.

The likelihood of correlation G(−3) for the interpolation line downward to the right with angle 18 degrees is output from the AND calculating means 33A as the minimum of a value picked up from the chosen table of the first membership function MS1 at F(−3) and three values picked up from the chosen table of the second membership function MS2, which indicates the degree of uncorrelation, at level differences F(1), F(2) and F(3) obtained for three interpolation lines having a sign of slope opposite to the above interpolation line. Since the output of the first membership function represents a degree of correlation and the output of the second membership function represents a degree of uncorrelation, the output value G(−2) gives effective likelihood information in that direction since it becomes large if the correlation for the interpolation line downward to the right is high and the uncorrelation for the interpolation lines upward to the right is high.

The likelihood of correlation G(−2) for the interpolation line downward to the right with angle 27 degrees is output similarly from the AND calculating means 33B. G(3) and G(2) are similarly output from the AND calculating means 33D and 33C respectively.

Next, the operation of the consequent processing means 9 is described below referring to FIGS. 5 to 7.

Figure 6A:
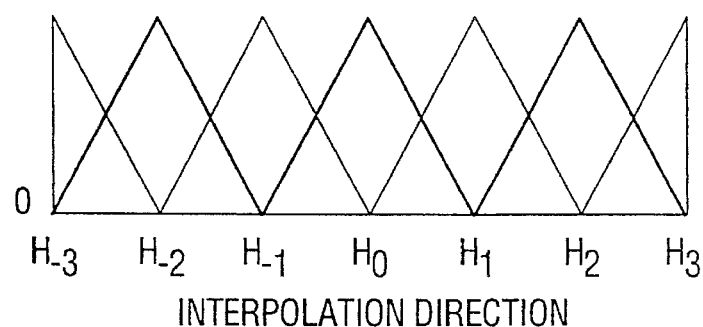
FIGS. 6(a)–6(b) show the graphs of membership functions of the fuzzy consequent processing means.
Figure 6B:
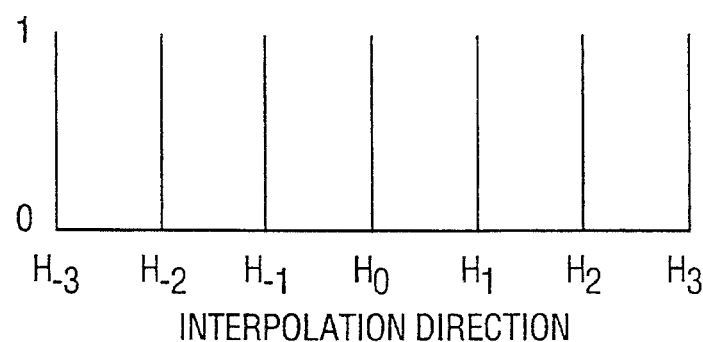

The consequent processing means 9 performs fuzzy inference and obtains the center of gravity with respect to the interpolating directions, ie. the interpolation line having the highest correlation based on the likelihoods of correlation G(−3) to G(3) output from the antecedent processing means 8 using membership functions of the fuzzy consequent processing means 9, as shown in FIGS. 6(a)–6(b).

FIG. 6(a) shows the membership functions of the fuzzy consequent processing means 9 that show directions of interpolation lines. In the present embodiment, a simplified fuzzy inference with the consequent part represented by integers is executed using simplified membership functions for simplifying computation, as shown in FIG. 6(b). Weights for respective interpolation lines are given to calculate the center of gravity as follows; H(−3)=−3, H(−2)=−2, H(−1)=1, H(0)=0, H(1)=1, H(2)=2 and H(3)=3.

The center of gravity J with respect to the interpolation direction is obtained by calculating the next equation (3) using the likelihood information G(−3) to G(3) given by the antecedent processing means 8 and the membership functions shown in FIG. 6(b).

$$J = \frac{\sum_{i=-3}^{3} G(i) \cdot H(i)}{\sum_{i=-3}^{3} G(i)} = \quad (3)$$

$$\frac{-3G(-3) - 2G(-2) - G(-1) + G(1) + 2G(2) + 3G(3)}{G(-3) + G(-2) + G(-1) + G(0) + G(1) + G(2) + G(3)}$$

When the center of gravity J is obtained, the interpolation line is determined based upon a value of the center of gravity J as stated below.

FIG. 5 shows a block diagram of the consequent processing means 9 that calculates the above formula (3). Adding means 51A adds G(−3) input from three parallel lines in place of tripling, adds G(−2) input from two parallel lines in place of doubling, and adds G(1). Adding means 51B adds G(3) input from three parallel lines, adds G(2) input from two parallel lines, and adds G(1). Subtracting means 52 obtains the numerator of formula (3) by subtracting the output of 51A from the output of 51B. G(0) is neither added nor subtracted since H(0)=0.

Adding means 51C calculates the denominator of formula (3) by adding the likelihoods of correlation G(−3) to G(3).

Dividing means 53 obtains the value J of formula (3), namely the center of gravity, by dividing the output of the subtracting means 52 by the output of adding means 51C. The output of the dividing means 53 represents the center of gravity of the interpolating direction, i.e. the interpolation line having the greatest correlation and theoretically takes a continuous value between −3 and 3. Its actual value in the present embodiment is expressed by one sign bit, two integral bits, and one decimal bit.

Figure 7:
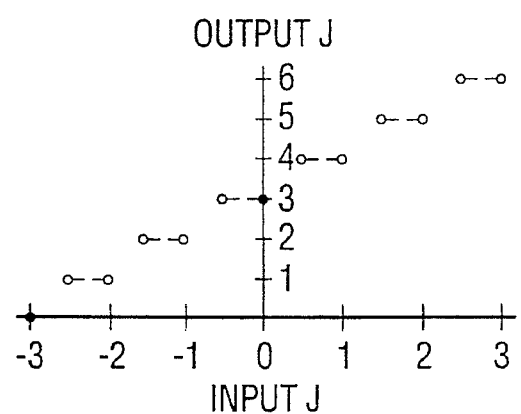
FIG. 7 shows the graph of the characteristic function for determining an interpolating direction in the first embodiment.

Direction determination means 54 converts a value with a sign output from the dividing means to an integer from zero to 6 represented with three bits using a conversion ROM table as shown in FIG. 7. In this conversion, the counting fractions over ½ as one and disregarding the rest is performed to the decimal part of the output value simultaneously. The integer J obtained by the direction determination means 54 indicates one of seven interpolation directions. This output J is input to the selection means 10 shown in FIG. 8.

A decoder 101 of the selection means decodes the 3-bit value J output from the consequent processing means 9 and activates a corresponding analog switch. The analog switch outputs the mean value of pixel levels for the chosen interpolation line to the image output terminal.

For example, if the output value of the dividing means 53 is −2.3, then the direction determining means 54 outputs 1, and the output 001 of decoder 101 becomes active, the buffer 100B becomes active, and the mean value in the interpolation direction H(−2) is output to the image output terminal, and it becomes the pixel level of the pixel $B_0$ to be interpolated.

Next, the interpolation apparatus according to the second embodiment of the present invention is described below with reference to attached figures.

Figure 9:
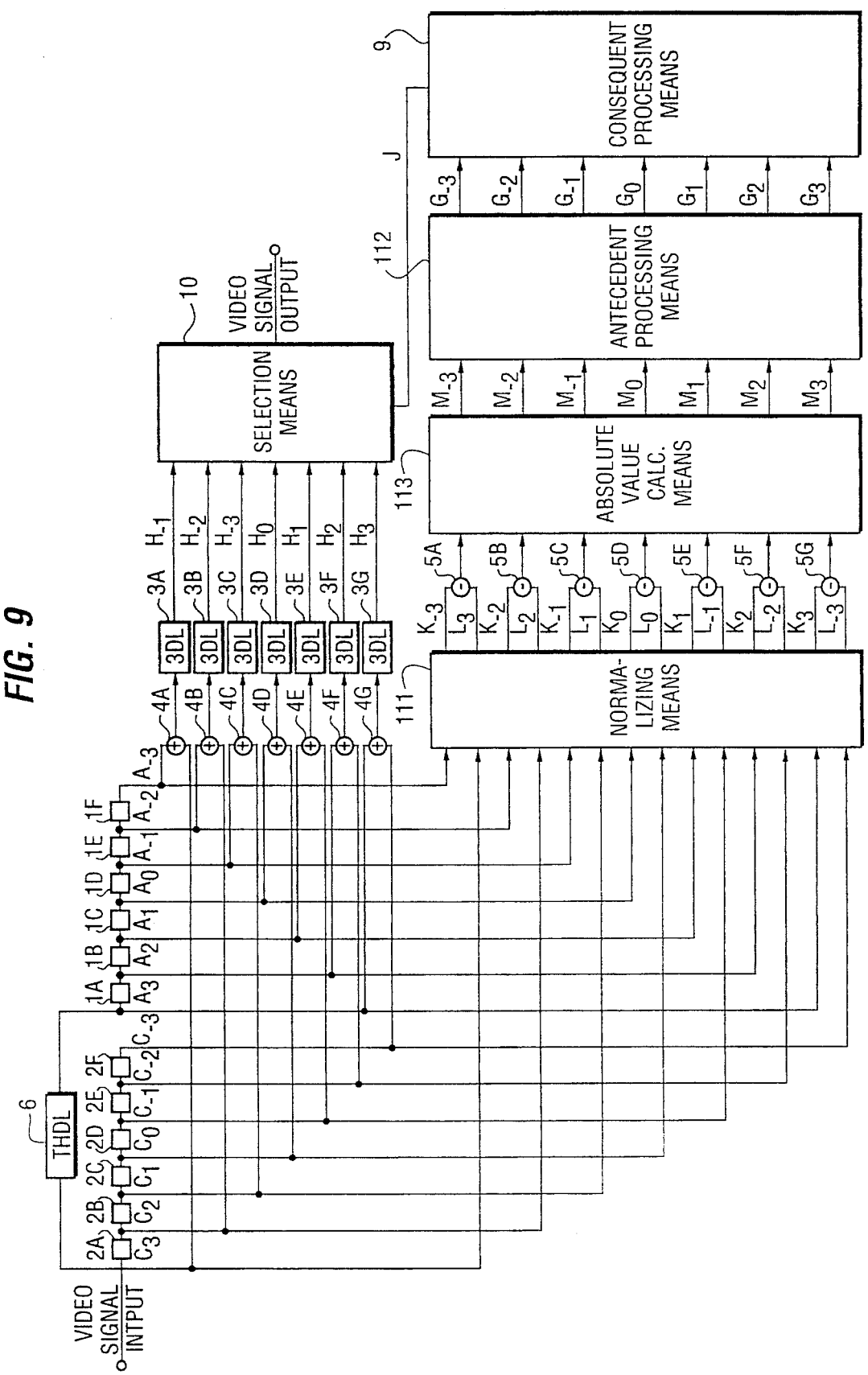
FIG. 9 shows a block diagram of the interpolation equipment of the second embodiment according to the present invention.

FIG. 9 shows a block diagram of the interpolation equipment of the second embodiment according to the present invention. In FIG. 9, horizontal delay means 1A to 1F, 2A to 2F, 3A to 3G, average calculating means 4A to 4G vertical delay means 6, subtracting means 5A to 5G, fuzzy consequent processing means 9, and choosing means 10 are the same as in FIG. 1 of the first embodiment.

A reference numeral 111 denotes a normalizing means that normalizes pixel levels A(−3) to A(3) and C(−3) to C(3) using the input minimum min and maximum max of the 14 pixel levels.

A reference numeral 113 denotes an absolute value calculating means that obtains absolute values of outputs from the subtracting means 5A to 5G.

A reference numeral 112 denotes a fuzzy antecedent processing means that obtains likelihoods of correlation using outputs from the absolute value calculating means 113.

Figure 11:
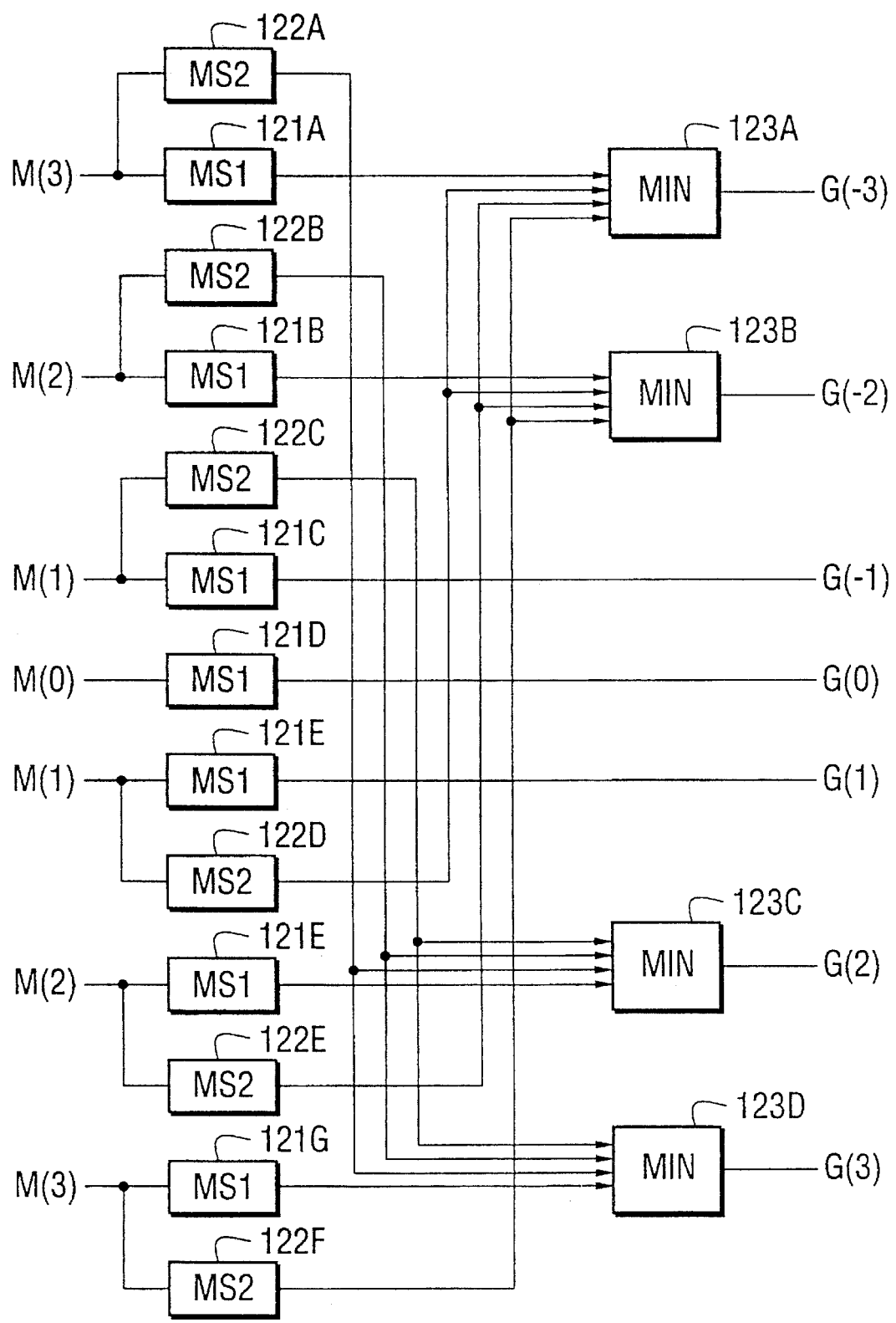
FIG. 11 shows a block diagram of the fuzzy antecedent processing means in the second embodiment.

FIG. 11 shows a block diagram of the antecedent processing means 112.

First membership function means 121A to 121G output signals that indicate degrees of correlation using a first membership function. Unlike in the first embodiment, the first membership function of the present embodiment is a unique function shown in FIG. 12(a).

Second membership function means 122A to 122F output signals that indicate degrees of uncorrelation using a second membership function. The second membership function of the present embodiment is similarly a unique function shown in FIG. 12(b).

Reference alphanumerals 123A to 123D denote circuits that perform a fuzzy logical product (AND) operation to obtain a minimum value.

The operation of the interpolation apparatus organized as above is described below with reference to FIG. 2 and FIG. 5 to FIG. 12.

The operation of each component from the image input to the selection means 10 in the upper half of FIG. 9 is the same as in the first embodiment. The operation of the components arranged in front of the fuzzy consequent processing means 9 in the lower half of FIG. 9 is different from that in the first embodiment.

Figure 10:
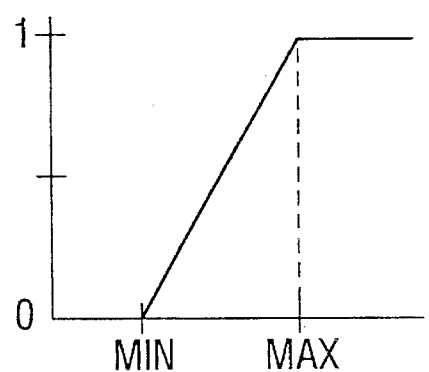
FIG. 10 shows the graph of the characteristic function for the normalizing means in the second embodiment.

Each pixel level of A(−3) to A(3) and C(−3) to C(3) is converted to a corresponding normalized level of K(−3) to K(3) and L(−3) to L(3) using max and min by the normalizing means 111. Specifically, the normalizing means obtains max and min among pixels levels A(−3) to A(3) and C(−3) to C(3) and performs the normalization by calculating (a) if max−min>0 then
K(n)=(A(n)−min)/(max−min)
L(n)=(C(n)−min)/(max−min), (b) if max−min=0 then
K(n)=0
L(n)=0, where n=−3, −2, −1, 0, 1, 2, 3. FIG. 10 shows a characteristic function by the normalizing means 10. This function takes values between 0 and 1.

Subtracting means 5A to 5G calculate a difference between normalized pixel levels K(n) and L(n) on one of interpolation lines including lines downward to the right with angle 18 degrees to the horizontal line, downward to the right with 27 degrees, downward to the right with 45 degrees, vertical, upward to the right with 45 degrees, upward to the right with 27 degrees and upward to the right with 18 degrees, respectively.

The se differences are converted to non-negative values M(−3) to M(3) by the absolute value calculating means 113 and to likelihoods of correlation G(−3) to G(3) by the antecedent processing means 112 for corresponding interpolation lines.

Figure 12A:
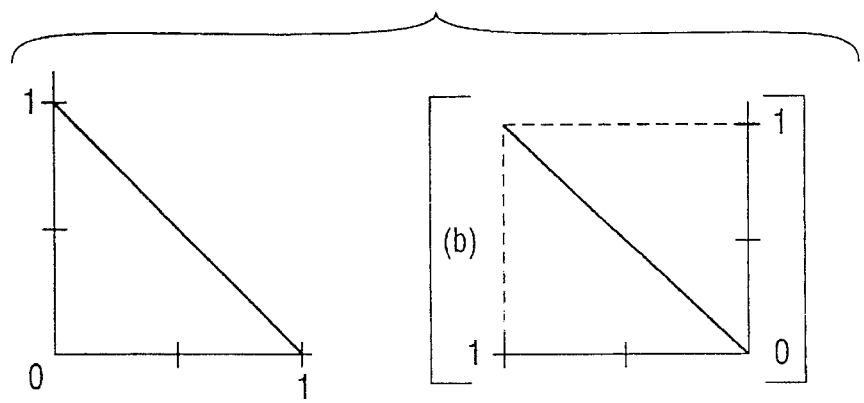
FIGS. 12(a)–12(b) show the graphs of the first membership function and the second membership function in the second embodiment.
Figure 12B:
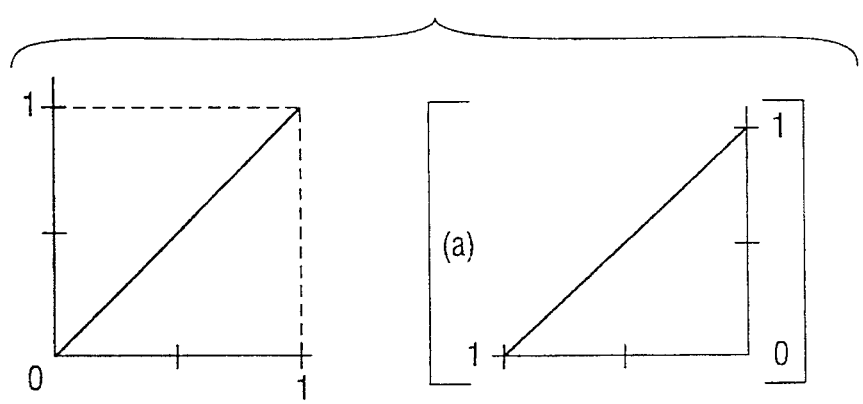

The operation of the antecedent processing means 112 in the present embodiment is simpler than the first embodiment, since the first and second membership functions of the antecedent, processing means are very simple as shown in FIGS. 12(a) and 12(b), respectively. Namely, since the level difference M(−3) to M(3) obtained by the absolute value calculating means 113 are normalized to have a value between 0 and 1, they are output as they are without using the second membership function means 122A to 122G. The first membership function means 121A to 121G can be replaced by inverters each of which outputs a complement of an-input value.

With the above configuration shown in FIG. 11, the antecedent processing means 112 outputs likelihoods of correlation G(−3) to G(3) based on the level differences M(−3) to M(3) for respective interpolation lines as in the first embodiment.

In the same way as in the first embodiment, the consequent processing means 9 performs a fuzzy inference based on input likelihoods G(−3) to G(3) and determines the interpolation line having the highest correlation. And the selection means 10 outputs an interpolated pixel level regarding the interpolation line determined to the image output terminal in the same way as in the first embodiment.

The present embodiments use the information on 14 pixels, but the method can be used for a larger or smaller number of pixels.

The present embodiments have been described in case of monochrome information, where pixel levels are luminance levels. In case of color information, it is not adequate to apply the present method to the R, G, and B signals independently. The correlation should be detected using only either one of the luminance signal or the G signal, and the R, G, and B signals should be interpolated in the same direction.

The present embodiments are organized by means of a hardware system, but substantially equivalent software procedures can realize the same process.

Figure 13:
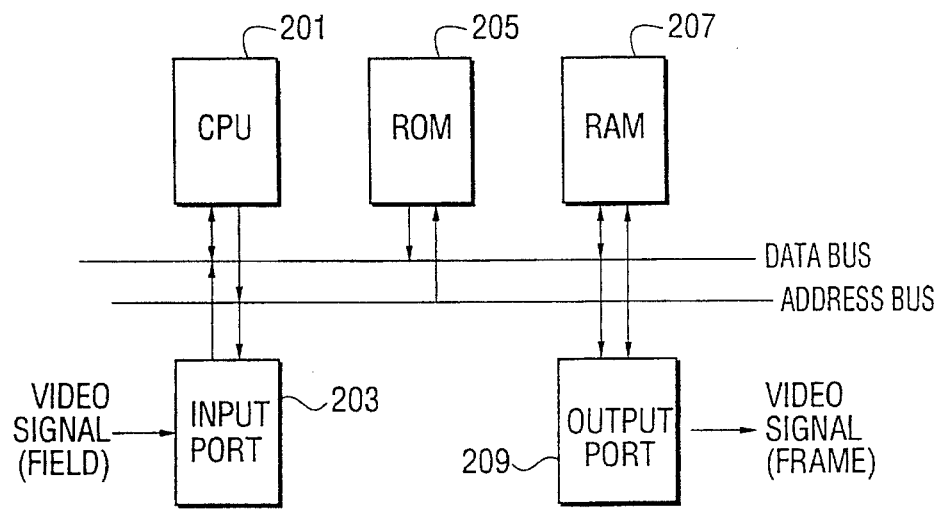
FIG. 13 is a block diagram showing a system composition according to the second preferred embodiment of the present invention.

FIG. 13 shows a system composition according to the third embodiment of the present invention wherein the interpolation processing is realized by the software.

CPU 201 reads a field video signal via an input port 203 to process it according to instructions stored in ROM 205. RAM 207 is used for an work area for executing instructions given from ROM 205 and a part thereof is used for forming three line buffers corresponding to three scan line data for interpolation operation. An output port 209 outputs a frame video signal including interpolated data according to the present invention.

Figure 14:
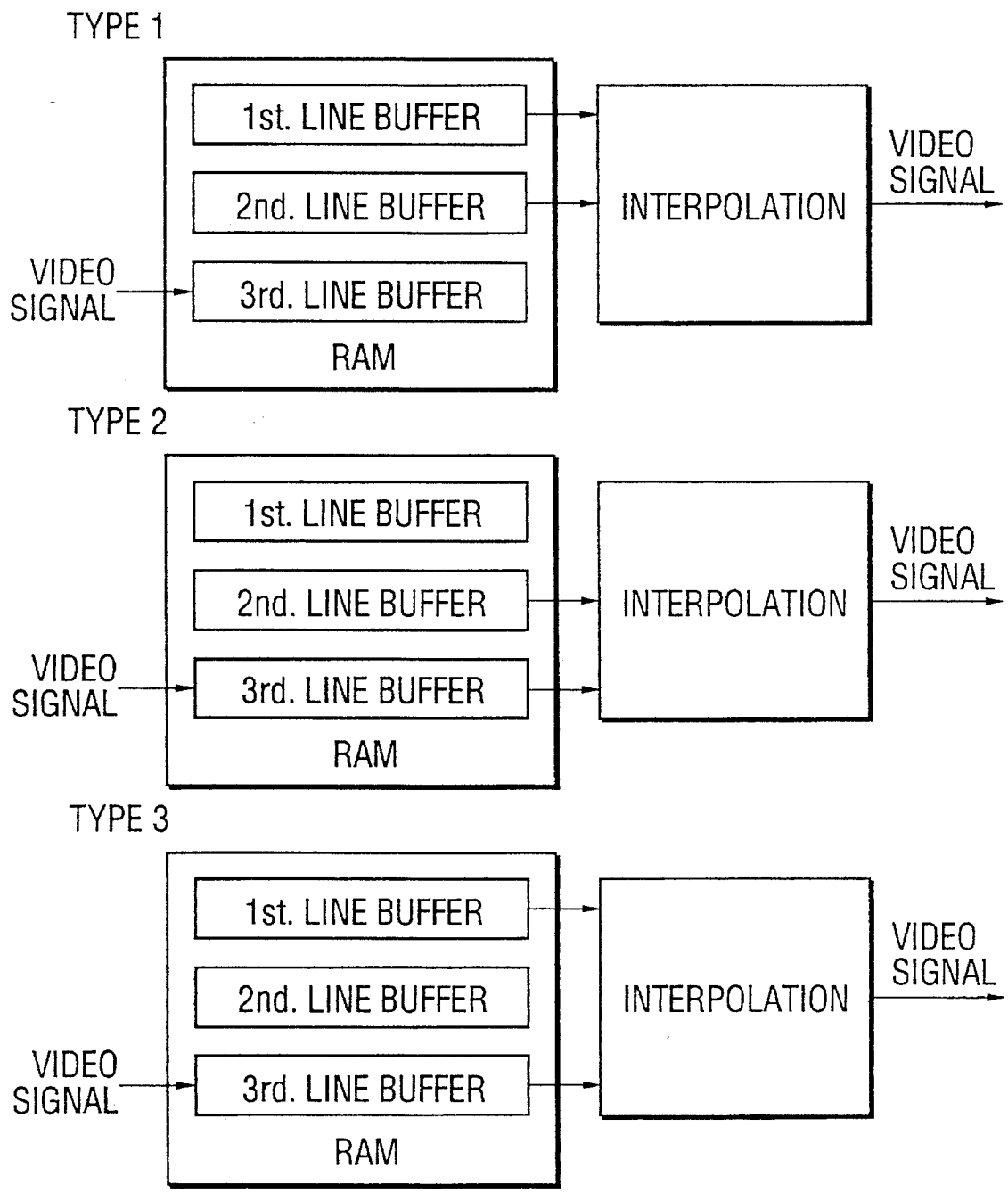
FIG. 14 is an explanation diagram for showing three types of processing upon executing the interpolation using three line buffers corresponding to three scan lines.

FIG. 14 shows a manner for executing the interpolation processing using three line buffers.

As shown in FIG. 14, first to third processing types are repeated cyclically in such a manner that, when a video signal is input to either one of first to third line buffers, interpolation operation is done using data stored in other two of them.

Figure 15:
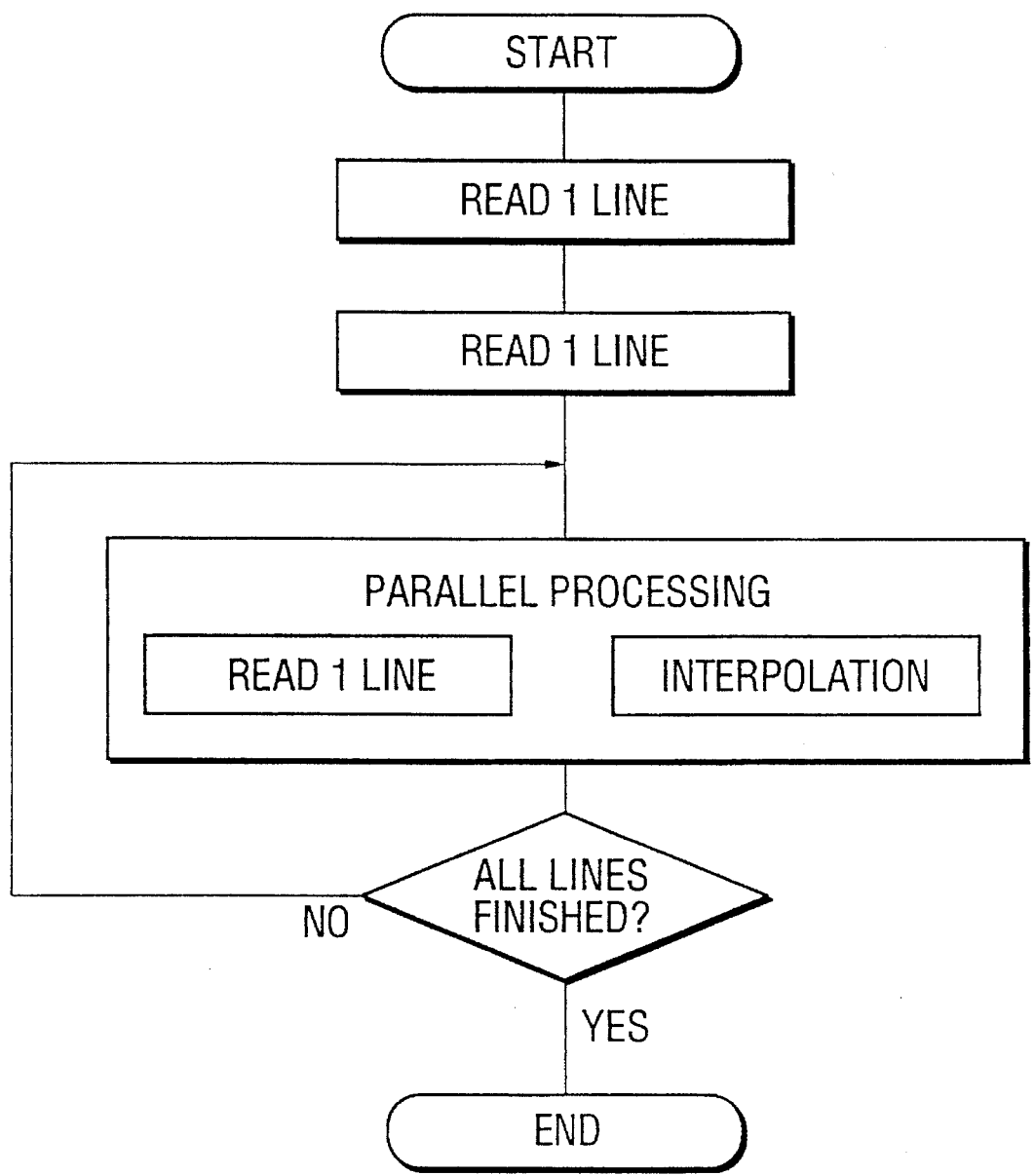
FIG. 15 is a flow chart of the main routine to be executed by the CPU of FIG. 13.

FIG. 15 shows a main routine of the interpolation operation to be executed by the CPU 201.

When this routine is started, the CPU 201 reads first two line data to store them in first and second line buffers. Then the CPU 201 executes a parallel processing wherein interpolation operation using data stored in two line buffers is executed while reading one line data into remaining one line buffer.

The parallel processing is repeated until all line data have been processed.

Figure 16:
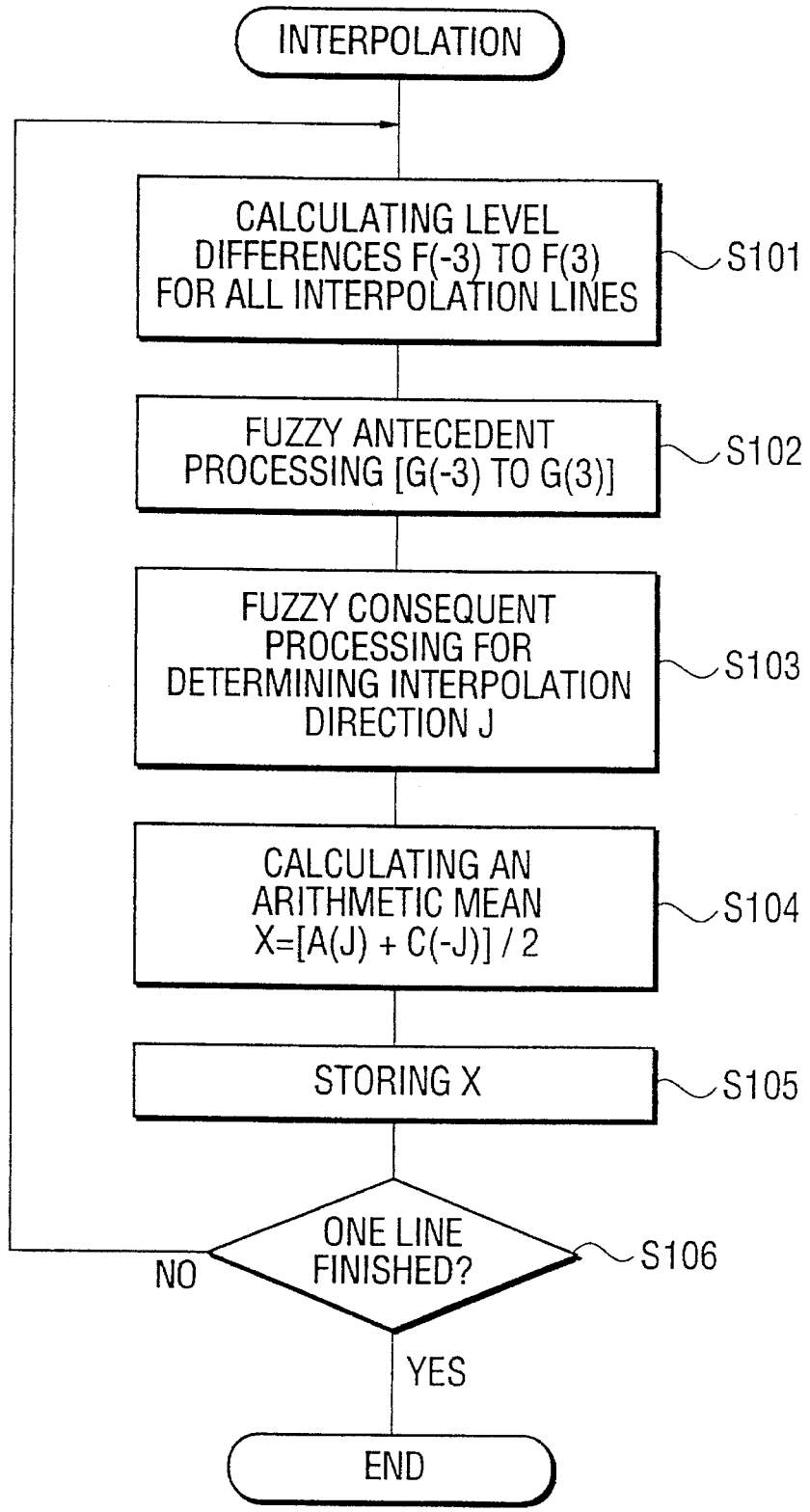
FIG. 16 is a flow chart of the subroutine for executing the interpolation calculation.
Figure 17:
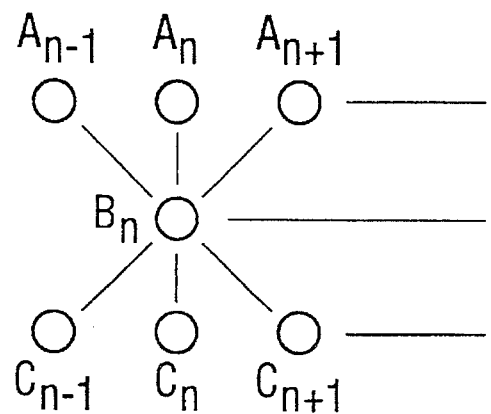
FIG. 17 shows pixels and interpolation lines for describing a prior interpolation method by correlation detection.
Figure 18:
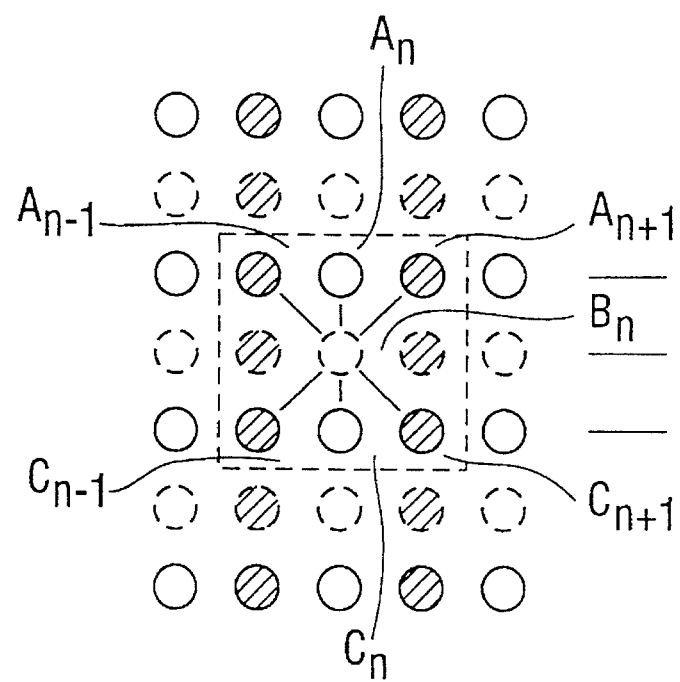
FIG. 18 shows an example of an image that generates an interpolation noise by the prior method.

FIG. 16 shows a flow chart of the interpolation operation.

When the interpolation processing is started, level differences for all interpolation lines are calculated in step S101 as follows;

$F(-3)=A(-3)-C(3)$ $F(-2)=A(-2)-C(2)$ $F(-1)=A(-1)-C(1)$ $F(0)=A(0)-C(0)$ $F(1)=A(1)-C(-1)$ $F(2)=A(2)-C(-2)$ $F(3)=A(3)-C(-3)$

In the next step S102, a fuzzy antecedent processing is executed using the level differences F(−3) to F(3) calculated in step S101. In this antecedent processing, likelihoods of correlation for respective interpolation lines are obtained by calculating the following equations using first and second membership functions MS1 and MS2 (described, supra).

$G(-3)=$MIN $\{$MS1$[F(-3)]$, MS2$[F(1)]$, MS2$[F(2)]$, MS2$[F(3)]\}$ $G(-2)=$MIN $\{$MS1$[F(-2)]$, MS2$[F(1)]$, MS2$[F(2)]$, MS2$[F(3)]\}$ $G(-1)=$MS1$[F(-1)]$ $G(0)=$MS1$[F(0)]$ $G(1)=$MS1$[F(1)]$ $G(2)=$MIN $\{$MS1$[F(2)]$, MS2$[F(-1)]$, MS2$[F(-2)]$, MS2$[F(-3)]\}$ $G(3)=$MIN $\{$MS1$[F(3)]$, MS2$[F(-1)]$, MS2$[F(-2)]$, MS2$[F(-3)]\}$

Where an operator MIN (*1, *2, *3, *4) is an operator which compaires all variables *1 to *4 with each other and picked up the minimum value among them, MS1 is a first membership function which gives a likelihood of correlation and MS2 is a second membership function which gives a likelihood of uncorrelation.

The first membership function is selected among functions shown in FIGS. 4(a)–4(d) and the second one is selected among functions shown in FIGS. 4(e)–4(h).

In step S103, a fuzzy consequent processing is executed to determine an interpolation line indicating the highest correlation. At first, a center of gravity J regarding the likelihoods obtained in step S102 is calculated as follows;

$J=[3 \cdot G(3)+2 \cdot G(2)+G(1)-G(-1)-2 \cdot G(-2)-3 \cdot G(-3)]/[G(3)+G(2)+G(1)+G(0)+G(-1)+G(-2)+G(-3)]$ Then an integer is obtained from J by counting fractions over ½ as one and disregarding the rest (See FIG. 7). The integer thus obtained indicates the number of the interpolation line having the highest correlation.

When the interpolation direction J is determined in step S103, an arithmetic mean x is calculated using pixel levels A(J) and C(−J) in step S104.

Thereafter, this arithmetic mean x is stored in RAM as an interpolation value for a pixel Bo to be interpolated. When the interpolation operation for all pixels on the line to be interpolated are finished, the process is ended to execute the next interpolation processing.

As has been described, the present invention provides the method and apparatus that globally determine the interpolation direction having the highest correlation based on the fuzzy information on the likelihood of correlation and the likelihood of uncorrelation for each interpolation line by means of the fuzzy inference. The present invention enables correlation detection to be performed with least errors of judgment compared with prior methods which perform local judgment. Specifically, the present invention brings the following advantages.

1. It makes possible a global judgment that detects not only the direction having the highest correlation but also the case where there is no correlation or there is correlation in all directions, even if the differences of pixel levels in all directions are small or even if the differences of pixel levels in all directions are large. Therefore, it minimizes detection errors and a noise caused by them and prevents the degradation of image quality.

2. It globally detects a contradiction between correlation in different directions and contributes to the minimization of detection errors and the prevention of degraded images.

3. It can detect correlation in little error, even if it uses pixel data of pixels far from the interpolated pixel. Therefore, it can perform interpolation in a direction near the horizontal. This kind of interpolation has been impossible so far because of high probability of misdetection.

4. It can detect correlation in little error for interpolation lines over 7 directions necessary for practical needs and can perform interpolation without a noise and with smooth oblique lines and high resolution.

With these advantages combined, the present invention provides interpolation that produces converted images without a noise and with smooth oblique lines and high resolution.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor for interpolating scan lines of an input image signal by determining an interpolation direction based on correlation between each pair of pixels located at intersections of one of plural interpolation lines passing a target pixel with scan lines located above and below said target pixel comprising:

a calculation means for calculating a level difference between each pair of pixels located on one of said plural interpolation lines for all said plural interpolation lines;

a fuzzy antecedent processing means comprising:

a first membership function means for calculating a likelihood of correlation between each pair of pixels located on one of said plural interpolation lines based on the level difference of each pair of pixels calculated by said calculation means;

a second membership function means for calculating an unlikelihood of correlation between a pair of pixels located on an interpolation line, having an opposite sign of slope of the interpolation line to which the likelihood of correlation is calculated, based on the level difference related to said interpolation line having an opposite sign of slope to the interpolation line to which the likelihood of correlation is calculated; and a judging means for judging a correlation between each pair of pixels by integrating said likelihood of correlation calculated by said first membership function means and said unlikelihood of correlation calculated by said second membership function means;

a fuzzy consequent processing means for determining an interpolation direction based on results of judgement of said fuzzy antecedent processing means; and an interpolation means for interpolating said target pixel based on levels of pixels located on the interpolation line determined by said fuzzy consequent processing means.

2. The image processor according to claim 1 in which the correlation of a pair of pixels located on a near vertical interpolation line is determined based on a likelihood of correlation regarding said near vertical interpolation line, and the correlation of a pair of pixels located on an interpolation line having a slope lower than a near vertical interpolation line is determined based on a likelihood of correlation regarding said interpolation line and unlikelihoods of correlation regarding plural interpolation lines each having an opposite sign of slope to that of said interpolation line.

3. The image processor according to claim 1 wherein said first and second membership function means provide first and second membership functions each being a function of the level difference between a pair of pixels and determined based on maximum and minimum values among all level differences.

4. The image processor according to claim 1 further comprising:

a detection means for detecting maximum and minimum levels among pixels on all said interpolation lines, and a normalization means for normalizing levels of said pixels on all said interpolation lines on the maximum and minimum levels detected.

5. The image processor according to claim 1 further comprising:

a normalization means for detecting maximum and minimum levels among pixels on all said interpolation lines and normalizing first and second membership functions of said first and second membership function means using the detected maximum and minimum levels.

6. The image processor according to claim 2 wherein said judging means of said fuzzy antecedent processing means determines the correlation regarding each interpolation line having a slope less than that of the near vertical interpolation line based on a fuzzy product of the likelihood of correlation regarding said each interpolation line and the unlikelihoods of correlation regarding interpolation lines each having a slope less than that of the near vertical interpolation line the sign of which is opposite to that of said each interpolation line.

7. The image processor according to claim 1 in which said fuzzy consequent processing means determines the interpolation direction by finding an interpolation line nearest to a gravity center of said likelihoods of correlation calculated by said fuzzy antecedent processing means.

* * * * *